United States Patent
Tsumagari et al.

(10) Patent No.: US 9,249,704 B2
(45) Date of Patent: Feb. 2, 2016

(54) BURNER FOR EXHAUST GAS PURIFICATION DEVICES

(71) Applicants: HINO MOTORS, LTD., Tokyo (JP); SANGO CO., LTD., Aichi-ken (JP)

(72) Inventors: Ichiro Tsumagari, Hino (JP); Ryo Shibuya, Hino (JP); Atsushi Koide, Miyoshi (JP)

(73) Assignees: Hino Motors, Ltd., Tokyo (JP); Sango Co., Ltd., Aichi-Ken (JP)

(*) Notice: Subject to any disclaimer, the term of this patent is extended or adjusted under 35 U.S.C. 154(b) by 0 days.

(21) Appl. No.: 14/381,685

(22) PCT Filed: Aug. 7, 2013

(86) PCT No.: PCT/JP2013/071431
§ 371 (c)(1),
(2) Date: Aug. 28, 2014

(87) PCT Pub. No.: WO2014/024944
PCT Pub. Date: Feb. 13, 2014

(65) Prior Publication Data
US 2015/0292376 A1     Oct. 15, 2015

(30) Foreign Application Priority Data

Aug. 7, 2012   (JP) ................................ 2012-174930
Nov. 7, 2012   (JP) ................................ 2012-245098

(51) Int. Cl.
*F01N 3/26*     (2006.01)
*F01N 3/025*   (2006.01)
(Continued)

(52) U.S. Cl.
CPC ............... *F01N 3/025* (2013.01); *F23C 7/002* (2013.01); *F23D 11/402* (2013.01);
(Continued)

(58) Field of Classification Search
CPC ........... F23G 7/065; F23G 7/06; F23Q 2/162; F23Q 2/167; F23D 3/00; F01N 3/26; F01N 3/2853; F02B 3/06

USPC ........................................ 422/168, 176, 182
See application file for complete search history.

(56) References Cited

U.S. PATENT DOCUMENTS 1,848,990 A    3/1932  Boyd et al.
2,181,261 A    11/1939 Breese
(Continued)

FOREIGN PATENT DOCUMENTS

CN    85200213    9/1985
CN    2238967     10/1996
(Continued)

OTHER PUBLICATIONS

International Search Report prepared by the Japanese Patent Office on Nov. 5, 2013, for International Application No. PCT/JP2013/071431.
(Continued)

*Primary Examiner* — Tom P Duong
(74) *Attorney, Agent, or Firm* — Sheridan Ross P.C.

(57) ABSTRACT

A burner for exhaust gas purification devices, comprising a base, a first pipe section, and a second pipe section. The first pipe section has a base end section, a tip section, a combustion chamber wherein combustion air and fuel are combusted, and a discharge port from which combusted gas is discharged. The base end section is fixed to the base. An air flowpath through which combustion air passes is provided between the first pipe section and the second pipe section. The burner for exhaust gas purification devices also comprises a compressable blocking section fixed to the first pipe section or the second pipe section, and interposed between the tip section of the first pipe section and the second pipe section. The entire perimeter of the tip section of the first pipe section is supported so as to be slidable relative to the second pipe section, via the blocking section.

6 Claims, 6 Drawing Sheets

(51) Int. Cl.

| | |
|---|---|
| *F23L 15/04* | (2006.01) |
| *F23D 11/40* | (2006.01) |
| *F23D 11/44* | (2006.01) |
| *F23G 7/06* | (2006.01) |
| *F23C 7/00* | (2006.01) |
| *F23M 5/00* | (2006.01) |

(52) U.S. Cl.
 CPC .......... *F23D 11/406* (2013.01); *F23D 11/408* (2013.01); *F23D 11/443* (2013.01); *F23D 91/02* (2015.07); *F23G 7/066* (2013.01); *F23L 15/04* (2013.01); *F23M 5/00* (2013.01); *F01N 2240/14* (2013.01); *F01N 2240/20* (2013.01); *F23C 2900/03005* (2013.01); *F23C 2900/06041* (2013.01); *F23D 2207/00* (2013.01); *F23D 2209/10* (2013.01); *F23D 2900/00003* (2013.01); *F23D 2900/11401* (2013.01); *F23D 2900/14021* (2013.01)

(56) References Cited

U.S. PATENT DOCUMENTS

| | | | |
|---|---|---|---|
| 2,458,066 | A | 1/1949 | Farkas et al. |
| 2,918,117 | A | 12/1959 | Griffin |
| 2,946,651 | A | 7/1960 | Houdry |
| 3,083,525 | A | 4/1963 | Morris |
| 2,806,517 | A | 9/1967 | Te Nuyl |
| 4,030,875 | A | 6/1977 | Grondahl et al. |
| 4,538,413 | A | 9/1985 | Shinzawa et al. |
| 4,565,380 | A | 1/1986 | Newman et al. |
| 4,716,725 | A | 1/1988 | Dettling et al. |
| 4,952,218 | A | 8/1990 | Lipp et al. |
| 4,982,570 | A | 1/1991 | Waslo et al. |
| 5,105,621 | A | 4/1992 | Simmons et al. |
| 5,140,814 | A | 8/1992 | Kreutmair et al. |
| 5,293,743 | A * | 3/1994 | Usleman et al. ...... F01N 3/2857 422/179 |
| 5,339,630 | A * | 8/1994 | Pettit ................ F01N 3/2033 431/354 |
| 5,370,526 | A | 12/1994 | Buschulte et al. |
| 5,450,869 | A | 9/1995 | Brittain et al. |
| 5,993,197 | A | 11/1999 | Alber et al. |
| 6,131,960 | A | 10/2000 | McHughs |
| 7,685,811 | B2 * | 3/2010 | Taylor, III et al. ............. 60/274 |
| 9,027,332 | B2 * | 5/2015 | Olivier .................. F01N 11/00 431/259 |
| 2002/0136997 | A1 | 9/2002 | Wolf et al. |
| 2003/0022123 | A1 | 1/2003 | Wolf et al. |
| 2003/0159445 | A1 | 8/2003 | Farmer et al. |
| 2006/0130469 | A1 | 6/2006 | Baeuerle et al. |
| 2009/0158720 | A1 | 6/2009 | Krause et al. |
| 2011/0061369 | A1 | 3/2011 | Yetkin et al. |
| 2012/0322012 | A1 | 12/2012 | Tsumagari et al. |

FOREIGN PATENT DOCUMENTS

| | | |
|---|---|---|
| CN | 1040861 | 3/1999 |
| CN | 1441198 | 9/2003 |
| CN | 102159890 | 8/2011 |
| CN | 202024329 | 11/2011 |
| DE | 4440716 | 7/1996 |
| DE | 202010005022 | 7/2010 |
| EP | 0031279 | 7/1981 |
| EP | 2075426 | 7/2009 |
| FR | 2438234 | 4/1980 |
| FR | 2540974 | 8/1984 |
| GB | 2035538 | 6/1980 |
| JP | 58-160726 A | 9/1983 |
| JP | 59-54707 | 4/1984 |
| JP | 59-93913 A | 5/1984 |
| JP | 60-58810 U | 4/1985 |
| JP | 600-58810 U | 4/1985 |
| JP | 60-162213 U | 10/1985 |
| JP | 61-29010 U | 2/1986 |
| JP | 61-280305 A | 12/1986 |
| JP | 4-350315 A | 4/1992 |
| JP | 6-84118 U | 12/1994 |
| JP | 2003-49636 A | 2/2003 |
| JP | 2009-41852 A | 2/2009 |
| JP | 4393858 B2 | 10/2009 |
| JP | 2011-157824 A | 8/2011 |
| JP | 2011-185493 A | 9/2011 |
| WO | WO2011/034884 A1 | 3/2011 |

OTHER PUBLICATIONS

Written Opinion prepared by the Japanese Patent Office on Nov. 5, 2013, for International Application No. PCT/JP2013/071431.
Partial Search Report for European Patent Application No. 13828197.7, dated Jun. 26, 2015, 7 pages.
Partial Search Report for European Patent Application No. 13828740.4, dated Jun. 29, 2015, 7 pages.
Official Action for China Patent Application No. 201380011673.0, dated Mar. 19, 2015, 5 pages.
Official Action for China Patent Application No. 201380004670.4, dated Dec. 26, 2014, 5 pages.
Official Action for U.S. Patent Application No. 201380004670.4, dated Dec. 26, 2014, 5 pages.
Official Action for Australia Patent Application No. 2013300488, mailed Mar. 3, 2015, 3 pages.

* cited by examiner

BURNER FOR EXHAUST GAS PURIFICATION DEVICES

CROSS-REFERENCE TO RELATED APPLICATIONS

This application is a national stage application under 35 U.S.C. 371 and claims the benefit of PCT Application No. PCT/JP2013/071431 filed 7 Aug. 2013, which designated the United States, which PCT Application claimed the benefit of Japanese Patent Application No. 2012-174930 filed 7 Aug. 2012, and Japanese Patent Application No. 2012-245098 filed on 7 Nov. 2012, the disclosure of each of which are incorporated herein by reference.

FIELD OF THE INVENTION

The present invention relates to a burner for an exhaust purification device, which is used in an exhaust purification device for purifying an exhaust gas from an internal-combustion engine (hereinafter, referred to as an engine) and raises the temperature of the exhaust gas.

BACKGROUND OF THE INVENTION

Conventional diesel engines include an exhaust gas purification device in the exhaust passage, and the exhaust gas purification device includes a diesel particulate filter (DPF), which captures particulates contained in an exhaust gas, and an oxidation catalyst. Such an exhaust gas purification device treats an exhaust gas to raise the temperature in order to maintain the function of purifying an exhaust gas. The treatment regenerates the DPF by burning the particulates captured by the DPF and activates the oxidation catalyst. A burner that performs the treatment for raising the temperature of the exhaust gas is arranged upstream of the DPF and the oxidation catalyst.

One example of the structure of the burner is a multilayer tube structure. In the multilayer tube structure, a plurality of tubular members is overlapped to be coaxial. A burner having the multilayer tube structure is advantageous for saving space and raising the temperature of air for combustion.

For example, Patent Document 1 discloses a combustor that includes a combustion tube including an outer tube and an inner tube, a short auxiliary combustion tube arranged radially inside of the inner tube, and a vaporization tube arranged radially inside of the auxiliary combustion tube. The bottom of each tube is fixed to a base. When the combustor is activated, fuel is injected in the auxiliary combustion tube and is vaporized in a premixing region arranged in the auxiliary combustion tube. The vaporized fuel is mixed with air for combustion supplied from the vaporization tube. A flame occurs in a combustion chamber by igniting a premixed air-fuel mixture, in which the fuel and the air for combustion are mixed. In this way, the premixed air-fuel mixture is combusted. An air flow path, through which air for combustion passes, is provided between the inner and outer tubes. The air for combustion supplied to the flame promotes combustion.

PRIOR ART DOCUMENT

Patent Document

Patent Document 1: Japanese Laid-Open Patent Publication No. 58-160726

SUMMARY OF THE INVENTION

Problem that the Invention is to Solve

Since a flame occurs in a head portion of the inner tube, the inner tube is heated to a high temperature and thermally expands mostly in the direction parallel to the central axis (in the axial direction). There is a space between the outer and inner tubes, and air passes through the space. Therefore, the outer tube has a lower temperature than the inner tube. As described above, because of the premixing region arranged inside of the auxiliary combustion tube, the auxiliary combustion tube has a lower temperature than the inner tube. For this reason, the expansion amount of the inner tube is greater than those of the auxiliary combustion tube and the outer tube during combustion.

In the burner with the multilayer tube structure, a difference of expansion amounts generally occurs between a tube exposed to a high temperature and a tube kept at a relatively low temperature. When the tubes are partially joined to each other by welding and the like, the difference between the expansion amounts of the tubes causes a large stress on the joining portion between the tubes. Even if the tubes are not joined to each other, there is a case, for example, in which the distal end of the inner tube is in a direct and close contact with the distal end of the outer tube as the aforementioned combustor. In this case, due to the radial expansion of the inner tube, the distal portion of the inner tube presses against the inner circumferential surface of the outer tube, and a force acts on the inner tube to hinder expansion in the axial direction. When ignition and extinction of the burner are repeated, each ignition and extinction causes stress on the joining portions, the contacting surfaces, and the like. As a result, depending on the usage conditions, damages such as fatigue and cracks may be occurred. This is not limited to the aforementioned burner, and burners with the multilayer tube structure generally have this kind of problem.

It is an objective of the present invention to provide a burner for an exhaust gas purification device that prevents tubes from being damaged due to a difference between the expansion amounts of the tubes in a multilayer tube structure.

In accordance with one aspect of the present disclosure, a burner for an exhaust gas purification device comprises a base, a first tube, and a second tube. The first tube includes a basal portion and a distal portion, a combustion chamber for combusting air for combustion and fuel, and a discharge port for discharging post-combustion gas. The basal portion is fixed to the base. An air flow path through which air for combustion passes is arranged between the first tube and the second tube. The burner for an exhaust gas purification device further comprises a compressible closing part, which is fixed to the first tube or the second tube and is arranged between the distal portion of the first tube and the second tube. The distal portion of the first tube has a circumference that is entirely, slidably supported by the second tube via the closing part.

According to the present aspect, the air flow path is provided between the second and first tubes. Because of the combustion chamber arranged inside of the first tube, the first tube has a higher temperature than the second tube. Therefore, when combustion starts, the expansion amount of the first tube is greater than that of the second tube. The distal end of the first tube is slidably supported by the second tube via the closing part. The closing part absorbs the radially-outward expansion of the first tube, while allowing the first tube to expand toward the distal end. Moreover, the closing part closes the distal end of an air passage. This suppresses leakage of air for combustion and suppresses damage caused by a difference between the thermal expansion amounts of the first and second tubes.

In another embodiment, the first tube is arranged radially inside of the second tube. The second tube includes a radially-narrowed portion. The closing part is held between the radially-narrowed portion of the second tube and the first tube.

In this case, since the closing part is held between the radially-narrowed portion of the second tube and the first tube, the thickness of the closing part is decreased compared to when the first and second tubes have constant diameters. Further, this decreases the diameter of the closing part compared to when the first tube has an enlarged diameter to reduce a space between the first and second tubes.

In another embodiment, the first tube is arranged radially inside of the second tube. The first tube includes a radially-enlarged portion. The closing part is held between the radially-enlarged portion of the first tube and the second tube.

In this case, since the annular closing part is held between the radially-enlarged portion of the first tube and the second tube, the thickness of the closing part is decreased compared to when the first and second tubes have constant diameters.

In another embodiment, the first tube includes a flange extending from a portion between the distal portion of the first tube and the closing part toward an inner circumferential surface of the second tube.

In this case, the flange arranged in a portion between the distal end portion of the first tube and the closing part closes the distal end of an air flow path at least in part, thereby suppressing leakage of air for combustion.

In another embodiment, the closing part is of a wire mesh. The first tube includes a hook for hooking the wire mesh. The hook projects from the outer circumferential surface of the first tube.

In this case, the closing part of a wire mesh absorbs the radial expansion of the first tube. The first tube also includes the hook for hooking the wire mesh. The hook projects from the outer circumferential surface of the first tube. The hook prevents the wire mesh from falling off and partially blocks an air flow, thereby suppressing leakage of air for combustion from an air flow path.

In another embodiment, the second tube is arranged radially outside of the first tube, so that a flow path of air for combustion is formed between the first tube and the second tube. The burner further comprises a first connecting tube portion and a second connecting tube portion. The first connecting tube portion is connected to the inner surface of the first tube and includes an opening at an end closer to the discharge port. The second connecting tube portion has a lid portion and partitions the combustion chamber from a premixing chamber. The second connecting tube includes a supply hole connected to the combustion chamber. The first connecting tube portion is inserted into the second connecting tube portion while being spaced from the second connecting tube portion.

In this case, the first and second connecting tube portions are overlapped, and a premixed air-fuel mixture has a longer flow path. This promotes mixture of the fuel and the air for combustion. The first tube expands in the axial direction without interference and extends toward the distal end. This suppresses change in the width of the flow path arranged between the first and second connecting tube portions.

DESCRIPTION OF THE PREFERRED EMBODIMENTS

First Embodiment

A first embodiment of a burner for an exhaust gas purification device according to the present invention will now be described with reference to FIG. 1 to FIG. 4.

Figure 1:
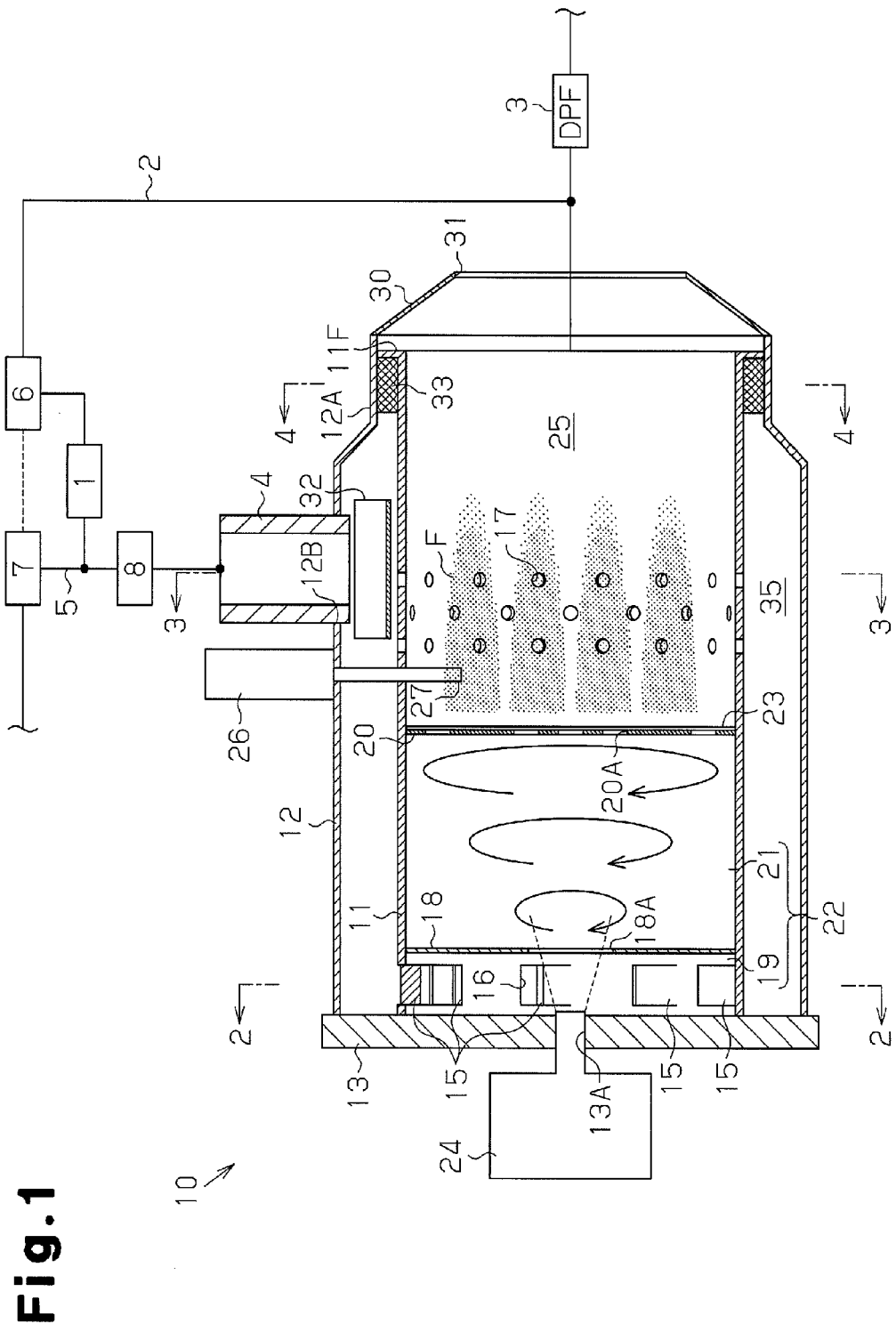
FIG. 1 is a schematic view of a burner for an exhaust gas purification device according to a first embodiment of the present invention.

As shown in FIG. 1, a diesel engine 1 includes, in an exhaust passage 2, a DPF 3, which captures particulates contained in an exhaust gas. The DPF 3 has a honeycomb structure made of a porous silicon carbide, for example, and captures particulates in the exhaust gas. A burner for an exhaust gas purification device (hereinafter, simply referred to as a burner) 10 is arranged upstream of the DPF 3. The burner 10 carries out a regeneration process of the DPF 3 by raising the temperature of an exhaust gas flowing into the DPF 3.

The burner 10 is connected to a compressor 7 via an air supply passage 4 and an intake passage 5 of the diesel engine 1. The compressor 7 rotates with a turbine 6 arranged in the exhaust passage 2.

An air valve 8 is arranged on the air supply passage 4. The air valve 8 is capable of changing a flow path cross-sectional area of the air supply passage 4. Opening and closing of the air valve 8 is controlled by a control unit, not shown. When the air valve 8 is in an open state, some intake air flowing through the intake passage 5 is introduced into the burner 10 from the air supply passage 4 as air for combustion.

The burner 10 will now be described in detail. The burner 10 has a dual tube structure, in which an inner tube 11 as a first tube and an outer tube 12 as a second tube are overlapped to be coaxial. The inner tube 11 made from metal and shaped substantially cylindrical has openings at both ends in the direction parallel to the central axis. The inner tube 11 includes a basal portion as a first end portion in the axial direction or a bottom portion, and a distal portion as a second end portion in the axial direction or a head portion. The opening of the bottom portion is fixed to and closed by a disk-shaped base 13. The opening of the head portion of the inner tube 11 is open, and a flange 11F projects radially outward from the entire circumferential rim at the distal edge.

Figure 2:
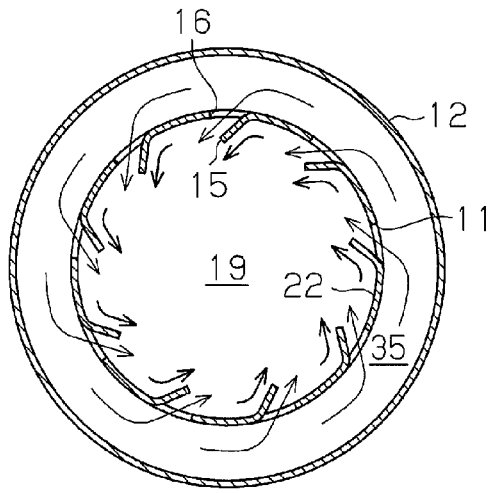
FIG. 2 is a cross-sectional view taken along line 2-2 in FIG. 1.

Blades 15 are arranged in the basal portion of the inner tube 11. As shown in FIG. 2, the blades 15 are formed by cutting and raising parts of the circumferential wall radially inward in the basal portion of the inner tube 11. The blades 15 are arranged at equal intervals in the circumferential direction of the basal portion. Forming the blades 15 forms first introduction holes 16, through which the exterior of the inner tube 11 is connected to the interior.

As shown in FIG. 1, a plurality of second introduction holes 17 extends through the sidewall of the inner tube 11 in the substantially axial center. The second introduction holes 17 are shaped circular and arranged at equal intervals in the circumferential direction of the inner tube 11.

An orifice plate 18 is arranged radially inside of the basal portion of the inner tube 11. The rim of the orifice plate 18 is joined to the inner circumferential surface of the inner tube 11. An orifice 18A is arranged in the center of the orifice plate 18. The basal portion of the inner tube 11, the base 13, and the orifice plate 18 define a first mixing chamber 19 for mixing fuel with air for combustion.

A fuel supply port 13A for fixing the injection port of a fuel supply unit 24 is arranged in the substantially radially-central location of the base 13. The fuel supply unit 24 is connected to a fuel pump and a fuel valve, neither shown. Opening the fuel valve delivers fuel from the fuel tank to the fuel supply unit 24. The delivered fuel is vaporized in the fuel supply unit 24 and injected into the first mixing chamber 19. At this time, the injection direction of fuel is adjusted so that the orifice 18A is on the line extending in the injection direction.

A disk-shaped burner head 20 is arranged closer to the head portion than the orifice plate 18 in the inner tube 11. The rim of the burner head 20 is joined to the inner circumferential surface of the inner tube 11. A large number of air holes 20A extend through the burner head 20. The burner head 20, the inner tube 11, and the orifice plate 18 define a second mixing chamber 21. The first mixing chamber 19 and the second mixing chamber 21, described above, form a premixing chamber 22 for mixing fuel with air for combustion.

A metal mesh 23 for avoiding backfire is arranged at the burner head 20 at a position close to the opening of the head portion. In the present embodiment, the metal mesh 23 is arranged on the upstream face of the burner head 20, but may be arranged on the opposite face or on the both.

The burner head 20 and the inner tube 11 define a combustion chamber 25 for generating a flame F. An insertion hole is formed in the combustion chamber 25. The insertion hole is closer to the burner head 20 than the location where the second introduction holes 17 are formed. The insertion hole extends through the inner tube 11. The ignition portion 27 of a spark plug 26 is inserted into the insertion hole.

The outer tube 12 is made from metal and shaped substantially cylindrical. The outer tube 12 has openings at both ends in the direction parallel to the central axis. The outer tube 12 includes a basal portion as a first end portion in the axial direction or a bottom portion, and a distal portion as a second end portion in the axial direction or a head portion. The opening of the bottom portion of the outer tube 12 is closed by the base 13. A lid portion 30 is arranged on the opening of the head portion of the outer tube 12. A discharge port 31 is arranged in the center of the lid portion 30. The discharge port 31 is connected to the exhaust passage 2, and supplies a post-combustion gas delivered from the combustion chamber 25 to the exhaust passage 2.

Figure 3:
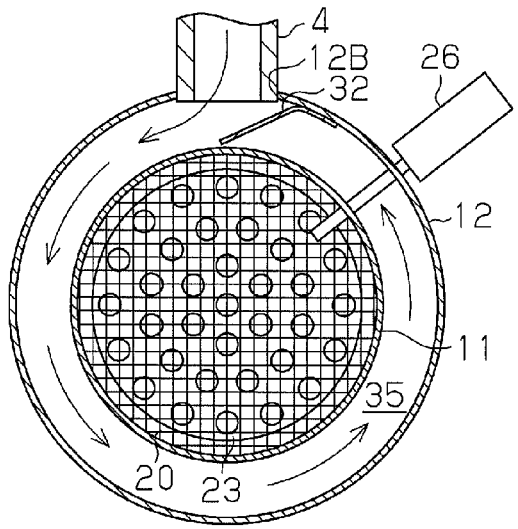
FIG. 3 is a cross-sectional view taken along line 3-3 in FIG. 1.

An air supply port 12B for fixing the inlet of the air supply passage 4 is arranged in the outer tube 12 at a position close to the opening of the head portion. As shown in FIG. 3, a guide plate 32 is arranged on the inner circumferential surface of the outer tube 12 at a position near the opening of the air supply port 12B. The guide plate 32 is fixed to the outer tube 12 in a cantilever-like manner in a state that the lateral face of the guide plate 32 is inclined in the direction along the inner circumferential surface of the outer tube 12. The guide plate 32 is inclined in the same direction as the blades 15 on the inner tube 11.

A distribution chamber 35 is arranged between the inner circumferential surface of the outer tube 12 and the outer circumferential surface of the inner tube 11. The distribution chamber 35 distributes air for combustion to the first mixing chamber 19 and the combustion chamber 25. As shown in FIG. 2, the distribution chamber 35 is shaped annular to surround the inner tube 11. As shown in FIG. 1, the distribution chamber 35 is connected to the first mixing chamber 19 through the first introduction holes 16 arranged in the basal portion of the inner tube 11. The distribution chamber 35 is also connected to the combustion chamber 25 through the second introduction holes 17 formed in the substantially center of the inner tube 11.

As shown in FIG. 1, the head portion of the outer tube 12 includes a radially-narrowed portion 12A formed by decreasing the outer and inner diameters. The flow path cross-sectional area is decreased with the radially-narrowed portion 12A in the distal portion of the distribution chamber 35. A small gap, which corresponds to a thermal expansion amount, is provided between the radially-narrowed portion 12A and the flange 11F of the inner tube 11.

Figure 4:
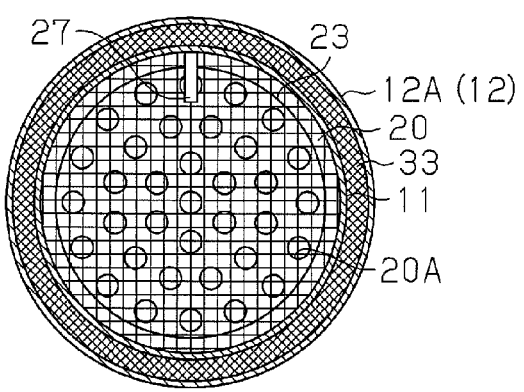
FIG. 4 is a cross-sectional view taken along line 4-4 in FIG. 1.

As shown in FIG. 4, the wire mesh 33 as a closing part is shaped annular by compression and is supported between the radially-narrowed portion 12A and the inner tube 11. The wire mesh 33 is fixed to the outer circumferential surface of the inner tube 11 by spot welding and the like, and comes in contact with the inner circumferential surface of the outer tube 12. As shown in FIG. 1, the distal face of the wire mesh 33 is closed by the flange 11F.

The wire mesh 33 is formed from a metal mesh shaped annular by compression. The metal mesh has a mesh size, which is the distance between the wires, of a few millimeters. When the inner tube 11 radially expands, the wire mesh 33 is compressed to absorb the expansion of the inner tube 11.

Operation of the burner 10 of the first embodiment will now be described.

When a regeneration process of the DPF 3 starts, the air valve 8 is controlled to be in the open state, and the fuel supply unit 24 and the spark plug 26 are activated. When the air valve 8 is in the open state, some intake air flowing through the intake passage 5 is introduced to the distribution chamber 35 as air for combustion from the air supply passage 4 through the air supply port 12B. At this time, as shown in FIG. 3, the guide plate 32 guides the air for combustion, thereby suppressing a flow of the air for combustion in the direction against the inclined direction of the guide plate 32. As shown by the arrows in FIG. 3, the air for combustion keeps swirling in a predetermined direction and flows in the direction opposite toward the discharge port 31.

As shown in FIG. 1, the wire mesh 33 and the flange 11F close a gap between the distal portion of the inner tube 11 and the opening of the head portion of the outer tube 12. This interferes with a flow of air from the air supply port 12B toward the discharge port 31 and suppresses leakage of air for combustion from the opening of the outer tube 12.

Some of the air for combustion introduced to the distribution chamber 35 is introduced to the combustion chamber 25 through the second introduction holes 17. As shown in FIG. 2, the remaining portion of the air for combustion is introduced to the first mixing chamber 19 through the first introduction holes 16. As described above, since the guide plate 32 and the blades 15 are inclined in the same direction, the air for combustion does not lose the momentum of swirling. Rather, the air for combustion gains momentum of swirling and is introduced to the first mixing chamber 19.

The swirling flow generated by the blades 15 flows toward the orifice 18A while converging to the radially-central region of the inner tube 11, which is a region to which the fuel supply unit 24 supplies fuel. As described above, since the location of the orifice 18A corresponds to the fuel injection direction, the center of swirling of the air for combustion overlaps with the fuel injection direction by the fuel supply unit 24. The fuel is caught in the swirling flow and spreads outward from the center of the swirling flow. A large part of injected fuel passes through the orifice 18A.

The premixed air-fuel mixture, in which air for combustion and fuel are mixed, keeps a swirling flow in a predetermined direction and is discharged to the second mixing chamber 21 through the outlet of the orifice 18A. Since the downstream pressure of the orifice 18A is more reduced than the upstream pressure, the mixed air-fuel mixture spreads throughout the second mixing chamber 21.

In this way, the premixed air-fuel mixture mixed in the second mixing chamber 21 is introduced to the combustion chamber 25 through the air holes 20A of the burner head 20. When the ignition portion 27 ignites the premixed air-fuel mixture flowing into the combustion chamber 25, a flame F occurs in the combustion chamber 25. The premixed air-fuel mixture is combusted, and a post-combustion gas is generated. At this time, as shown in FIG. 1, air for combustion is supplied to near and downstream of the ignition portion 27 from the distribution chamber 35 through the second introduction holes 17. As a result, the air for combustion and the post-combustion gas are exchanged, and combustion is promoted.

A post-combustion gas generated in the combustion chamber 25 is supplied to the exhaust passage 2 through the discharge port 31. The temperature of an exhaust gas flowing into the DPF 3 is raised by the post-combustion gas mixed with an exhaust gas in the exhaust passage 2. In the DPF 3 drawing such an exhaust gas, the temperature rises to the target temperature to burn the captured particles.

When a premixed air-fuel mixture is combusted in the combustion chamber 25, the post-combustion gas at a high temperature heats the inner tube 11. For this reason, after combustion starts, heat propagated via the inner tube 11 raises the temperature of air for combustion flowing in the distribution chamber 35. The air for combustion at the raised temperature is introduced to the first mixing chamber 19 through the first introduction holes 16. This suppresses liquidation of already vaporized fuel after combustion starts and promotes vaporization of liquidized fuel at that time. Moreover, the air for combustion in the distribution chamber 35 swirls around the inner tube 11, and has a longer flow path in the distribution chamber 35 than when air for combustion linearly flows toward the first introduction holes 16 in the distribution chamber 35. Thus, the air for combustion at a higher temperature is introduced to the first mixing chamber 19.

In this way, while the inner tube 11 is heated by a post-combustion gas and the like, the outer tube 12 is exposed to the air for combustion passing through the distribution chamber 35. For this reason, after combustion starts, the expansion amount of the inner tube 11 is greater than the expansion amount of the outer tube 12, which is small. The inner tube 11 expands radially outward, but the radial expansion amount is small compared to the axial expansion amount. For this reason, the radial expansion amount of the inner tube 11 is absorbed by compression of the wire mesh 33. The inner tube 11 expands toward the discharge port 31 while the wire mesh 33 and the distal end of the flange 11F contact and slide on the inner circumferential surface of the outer tube 12.

In contrast, when the outer circumferential surface of the inner tube 11 closely contacts the inner circumferential surface of the outer tube 12 to close the distal portion of the distribution chamber 35, radially outward expansion of the inner tube 11 presses the distal portion of the inner tube 11 against the inner circumferential surface of the outer tube 12. Since a force acts on the inner tube 11 to interfere with the axial expansion, the inner tube 11 is not easily extended in the axial direction. However, in the present embodiment, the contact area between the wire mesh 33 and the inner circumferential surface of the outer tube 12 is smaller than, for example, the contact area when the outer circumferential surface of the inner tube 11 closely contacts the inner circumferential surface of the outer tube 12, and the frictional force is small when sliding. For this reason, the friction between the inner and outer tubes 11, 12 does not prevent the inner tube 11 from being axially extended by the expansion.

The wire mesh 33 only has to have the substantially same diameter as the inner diameter at the radially-narrowed portion 12A of the outer tube 12. If the outer tube 12 has a constant outer diameter from the basal to central portion, the diameter of the wire mesh 33 is smaller than that in a case in which the inner tube 11 has an enlarged diameter to narrow the distal portion of the distribution chamber 35. Thus, the contact area between the wire mesh 33 and the outer tube 12 can be reduced, and the friction required to slide the inner tube 11 can be further decreased. Moreover, the downsized wire mesh 33 suppresses leakage of air for combustion from the wire mesh 33, a space between the wire mesh 33 and the outer tube 12, or the like.

As described above, the following advantages are provided according to the first embodiment.

(1) The distribution chamber 35 is arranged between the outer and inner tubes 12, 11. Because of the combustion chamber 25 arranged in the inner tube 11, the inner tube 11 has a higher temperature than the outer tube 12. Therefore, when combustion starts, the expansion amount of the inner tube 11 is greater than that of the outer tube 12. The distal portion of the inner tube 11 is slidably supported relative to the outer tube 12 via the wire mesh 33. For this reason, while the wire mesh 33 absorbs the radially-outward expansion of the inner tube 11, the inner tube 11 can expand toward the distal end. Further, the wire mesh 33 closes the distal portion of the distribution chamber 35. This suppresses damage caused by a difference in the thermal expansion between the inner and outer tubes 11, 12, while suppressing leakage of air for combustion.

(2) Since the annular wire mesh 33 is held between the radially-narrowed portion 12A of the outer tube 12 and the inner tube 11, the thickness of the wire mesh 33 is decreased compared to when the diameters of the outer and inner tubes 12, 11 are fixed. Moreover, the diameter of the wire mesh 33 is decreased compared to when the inner tube 11 has an enlarged diameter.

(3) The flange 11F extends from the distal portion of the inner tube 11 toward the inner circumferential surface of the outer tube 12. For this reason, the flange 11F closes at least part of the distal portion of the distribution chamber 35, and this suppresses leakage of air for combustion.

Second Embodiment

A second embodiment according to the present invention will now be described with reference to FIG. 5. A burner 10 of the second embodiment only differs from the first embodiment in a part of the inner tube and a part of the outer tube. Like reference characters designate like or corresponding parts and the parts will not be described in detail.

Figure 5:
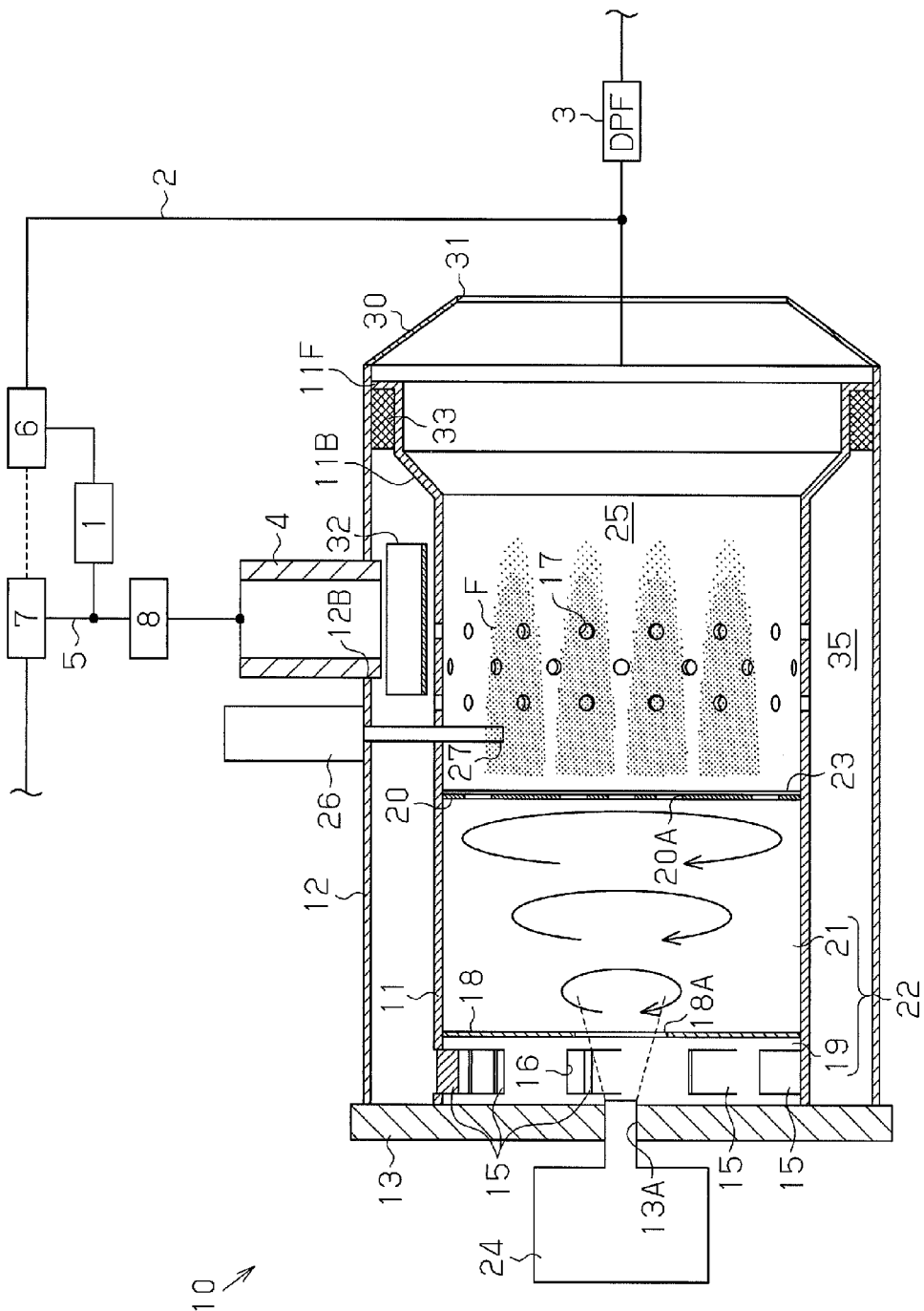
FIG. 5 is a schematic view of a burner for an exhaust gas purification device according to a second embodiment of the present invention.

As shown in FIG. 5, the outer and inner diameters of the outer tube 12 are uniform from the basal to distal end. A radially-enlarged portion 11B with increased outer and inner diameters is arranged at the distal end of the inner tube 11. The flow path cross-sectional area in the distal portion of the distribution chamber 35 is decreased with the radially-enlarged portion 11B. The flange 11F is formed at the distal end of the radially-enlarged portion 11B. The annular wire mesh 33 is supported between the radially-enlarged portion 11B and the outer tube 12.

Operation of the burner 10 of the second embodiment will now be described.

Similar to the first embodiment, when a premixed air-fuel mixture is combusted in the combustion chamber 25, the inner tube 11 is heated by the post-combustion gas at a high temperature. The heat propagated by the inner tube 11 raises the temperature of air for combustion flowing through the distribution chamber 35. The air for combustion at the raised temperature is introduced to the first mixing chamber 19 through the first introduction holes 16. This suppresses liquidation of already-vaporized fuel after combustion starts, as well as promoting vaporization of fuel liquidized at that time.

Similar to the first embodiment, after combustion starts, the expansion amount of the inner tube 11 is greater than the expansion amount of the outer tube 12, which is small. At this time, the radial expansion of the inner tube 11 is absorbed by compression of the wire mesh 33. The inner tube 11 expands in the axial direction toward the discharge port 31 while the wire mesh 33 and the distal end of the flange 11F contact and slide on the inner circumferential surface of the outer tube 12.

According to the second embodiment, the following advantage is provided in addition to the advantages (1) and (3) in the first embodiment.

(4) Since the annular wire mesh 33 is held between the outer tube 12 and the radially-enlarged portion 11B of the inner tube 11 in the second embodiment, the thickness of the wire mesh 33 is deceased compared to when the diameters of the outer and inner tubes 12, 11 are fixed.

Third Embodiment

Figure 6:
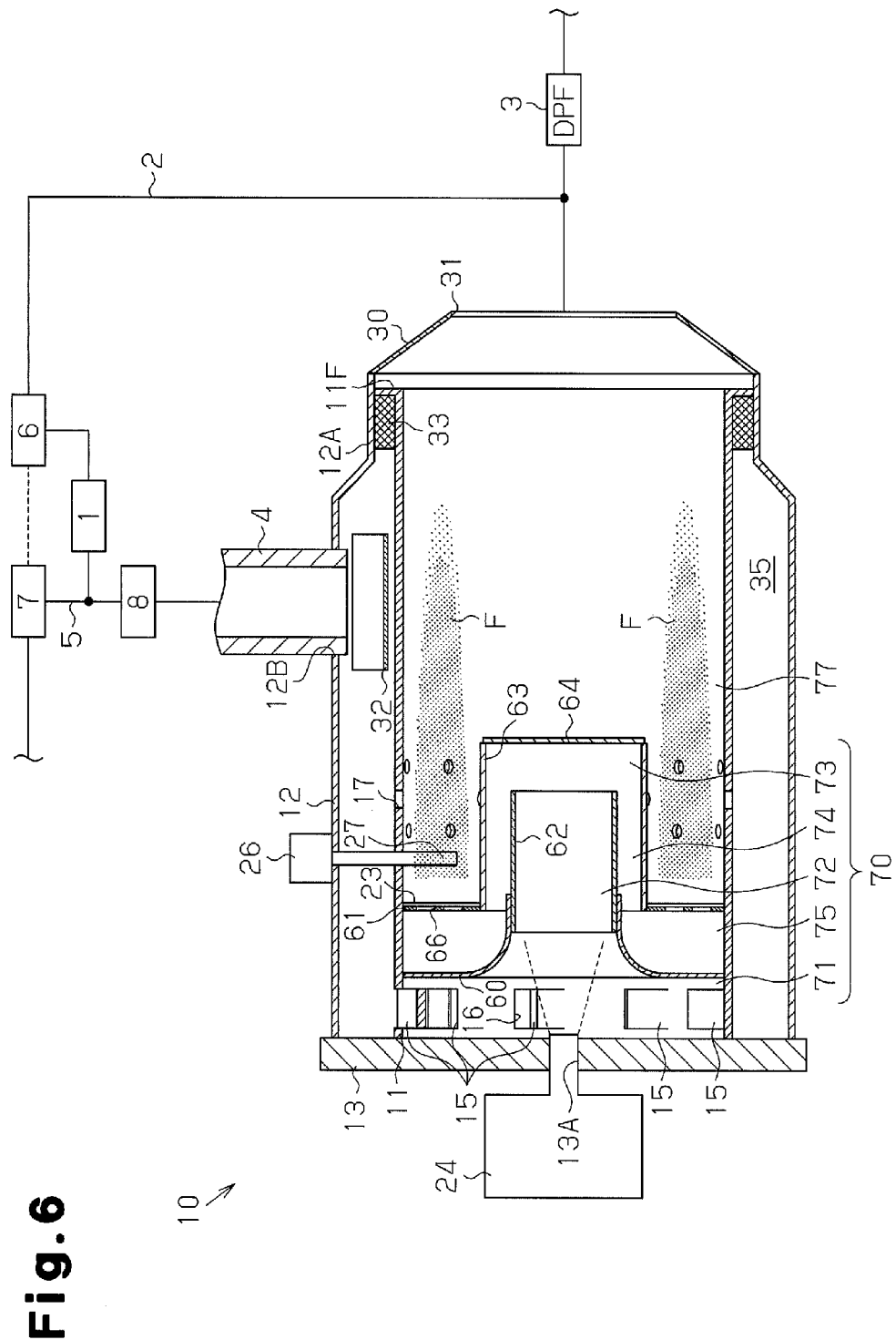
FIG. 6 is a schematic view of a burner for an exhaust gas purification device according to a third embodiment of the present invention.

A third embodiment of a burner for an exhaust gas purification device according to the present invention will now be described with reference to FIG. 6. The burner 10 of the third embodiment only differs from the first embodiment in the premixing chamber. Like or corresponding parts will not be described in detail.

The inner tube 11 and the outer tube 12 are fixed to the base 13 of the burner 10. The lid portion 30 having the discharge port 31 is arranged in the distal portion of the outer tube 12. The opening of the head portion of the inner tube 11 is open, and the flange 11F projects radially outward from the entire circumferential rim. The radially-narrowed portion 12A is arranged in the head portion of the outer tube 12.

The wire mesh 33 shaped annular by compression is supported between the radially-narrowed portion 12A and the inner tube 11. The flange 11F closes the distal face of the wire mesh 33.

The premixing chamber will now be described. A connecting wall 60 and a burner head 61 are fixed to the inner surface of the inner tube 11. The connecting wall 60 is arranged to include a portion between the blades 15 and the burner head 61 in the axial direction of the inner tube 11. The connecting wall 60, the base 13, and the inner tube 11 define a first mixing chamber 71.

The connecting wall 60 has an end portion in the axial direction, which projects toward the discharge port 31. An insertion opening is formed at the end portion. A first connecting tube 62 is inserted in the insertion opening. The first connecting tube 62 extends in the axial direction from the connecting wall 60, and opens toward the discharge port 31. The inner space of the first connecting tube 62 is a second mixing chamber 72. The connecting wall 60 and the first connecting tube 62 form a first connecting tube portion.

A connecting hole is formed in the center of the burner head 61, and a second connecting tube 63 fits into the connecting hole. The burner head 61 and the second connecting tube 63 form a second connecting tube portion. The second connecting tube 63 extends in the axial direction from the burner head 61 toward the discharge port 31, and the distal end is closed by a closing plate 64. The second connecting tube 63, the closing plate 64, and the opening end of the first connecting tube 62 define a third mixing chamber 73. The inner circumferential surface of the second connecting tube 63 and the outer circumferential surface of the first connecting tube 62 define a fourth mixing chamber 74. The connecting wall 60, the inner tube 11, and the burner head 61 define a fifth mixing chamber 75.

The mixing chambers 71-75 form a premixing chamber 70. The second to fifth mixing chambers 72-75 have flow path cross-sectional areas different from each other. The inner tube 11, the second connecting tube 63, the burner head 61, and the closing plate 64 define a combustion chamber 77.

Operation of the aforementioned burner 10 will now be described.

When a regeneration process of the DPF 3 is started, air for combustion flows into the distribution chamber 35. The air for combustion introduced by the guide plate 32 swirls around the inner tube 11.

Some of the air for combustion flowing in the distribution chamber 35 is introduced to the combustion chamber 77 through the second introduction holes 17. The remaining portion of the air for combustion is introduced to the first mixing chamber 71 through the first introduction holes 16. Similar to the first embodiment, a swirling flow is generated in the first mixing chamber 71.

In the first mixing chamber 71, the fuel supply unit 24 supplies fuel toward the swirling flow to produce a premixed air-fuel mixture, in which the air for combustion and the fuel are mixed. The premixed air-fuel mixture flows into the second mixing chamber 72 while swirling.

After passing through the second mixing chamber 72, the premixed air-fuel mixture turns around in the third mixing chamber 73, and flows into the fourth mixing chamber 74. Then, the premixed air-fuel mixture turns around again in the fifth mixing chamber 75, and flows into the combustion chamber 77 through the supply holes 66 of the burner head 61.

In the premixing chamber 70, a flow path is lengthened by the length of the mixing chambers 71-75, and this promotes mixing of air and fuel. Since the mixing chambers 71-75 have flow path cross-sectional areas different from each other, abrupt changes in the flow path cross-sectional area further promote mixing of air and fuel.

Ignition of the air-fuel mixture flowing into the combustion chamber 77 generates a flame F, which is an air-fuel mixture in combustion, in the combustion chamber 77. The flame F generates a combustion gas. Air for combustion is supplied to the flame F through the second introduction holes 17 formed in the inner tube 11.

The combustion gas generated in the combustion chamber 77 is supplied to the exhaust passage 2 through the discharge port 31. The combustion gas heats the premixed air-fuel mixture in the fourth mixing chamber 74 via the second connecting tube 63. This suppresses liquidation of already vaporized fuel and promotes vaporization of non-vaporized fuel.

In this way, while the inner tube 11 is heated by a post-combustion gas and the like, the outer tube 12 is exposed to air for combustion passing through the distribution chamber 35. The radial expansion of the inner tube 11 is absorbed by compression of the wire mesh 33. The inner tube 11 expands toward the discharge port 31 while the wire mesh 33 and the distal end of the flange 11F contact and slide on the inner circumferential surface of the outer tube 12. As described above, although the inner circumferential surface of the inner tube 11 is connected to the connecting wall 60 and the burner head 61, the inner tube 11 is expandable toward the discharge port 31. This suppresses change in the flow path cross-sectional areas of the third mixing chamber 73 and the fifth mixing chamber 75.

As described above, according to the burner 10 of the third embodiment, the following advantage is provided in addition to the advantages (1) to (3) in the first embodiment.

(5) The premixing chamber 70 of the burner 10 has a portion at which the flow path of the premixed air-fuel mixture is turned around. For this reason, the burner 10 has a longer flow path of the premixed air-fuel mixture than a burner including a premixing chamber not having such a turned-around portion. This promotes mixture of air for combustion and fuel and improves combustion quality of the premixed air-fuel mixture. Thus, the combustion gas contains a less amount of non-combusted fuel. In the outer tube 12 and the inner tube 11 as above, a thermal expansion difference occurs between the tubes. However, since the distal portion of the inner tube 11 is slidably supported by the outer tube 12 via the wire mesh 33, the inner tube 11 can expand toward the distal end while the wire mesh 33 absorbs the radially-outward expansion of the inner tube 11. This suppresses change in the flow path cross-sectional area of the premixing chamber 70.

Fourth Embodiment

Figure 7:
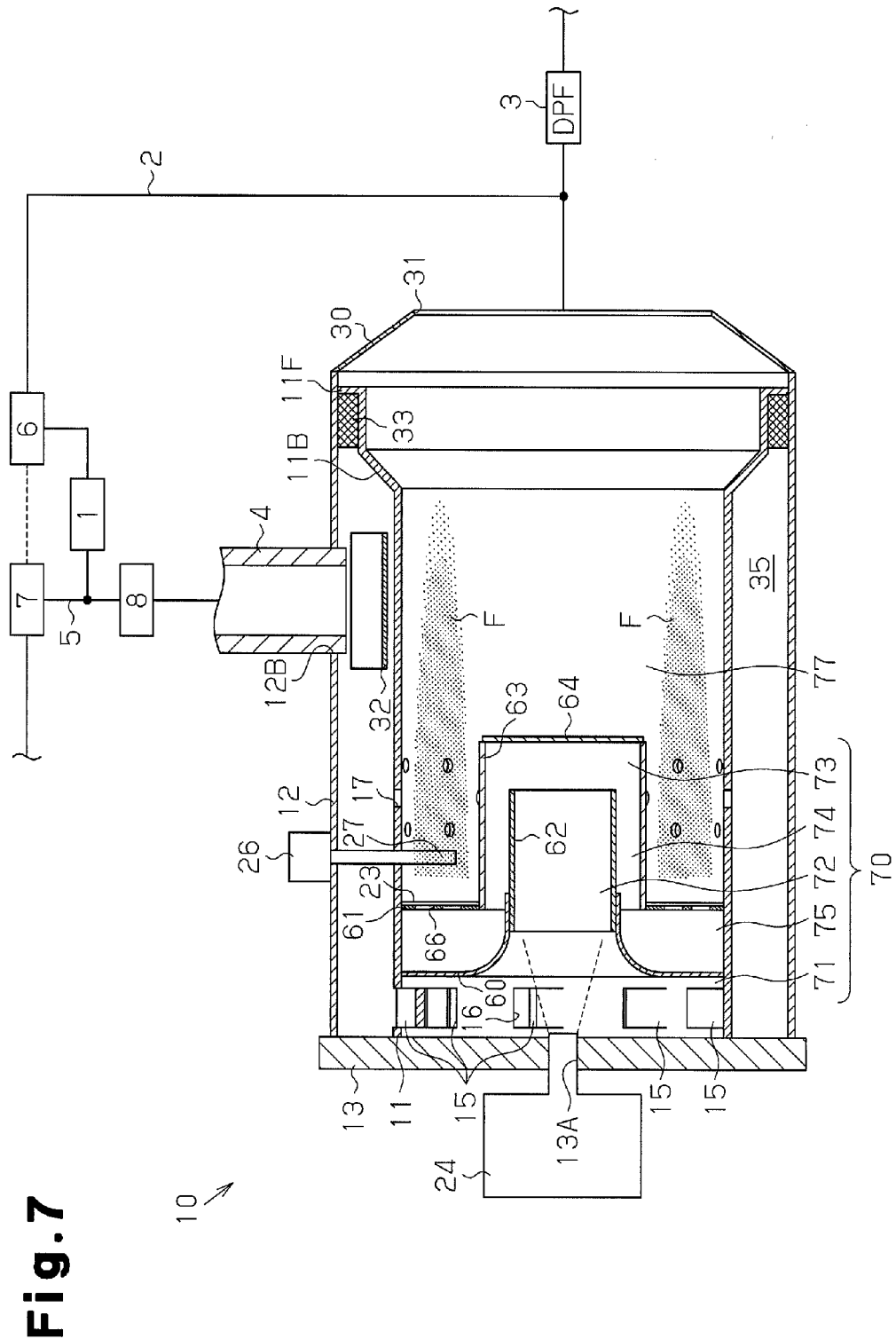
FIG. 7 is a schematic view of a burner for an exhaust gas purification device according to a fourth embodiment of the present invention.

A fourth embodiment of a burner for an exhaust gas purification device according to the present invention will now be described with reference to FIG. 7. The burner 10 of the fourth embodiment only differs from the second embodiment in the premixing chamber. In the fourth embodiment, the premixing chamber of the burner 10 of the second embodiment is modified to the premixing chamber of the third embodiment. Therefore, like or corresponding parts will not be described in detail.

The radially-enlarged portion 11B with increased outer and inner diameters is arranged at the distal end of the inner tube 11. The flange 11F is formed at the distal end of the radially-enlarged portion 11B. The annular wire mesh 33 is supported between the radially-enlarged portion 11B and the outer tube 12.

Operation of the burner 10 of the fourth embodiment will now be described.

Flows of combustion air, fuel, and a premixed air-fuel mixture are the same as those in the third embodiment. The radial expansion of the inner tube 11 is absorbed by compression of the wire mesh 33. The inner tube 11 expands in the axial direction toward the discharge port 31 while the wire mesh 33 and the distal end of the flange 11F contact and slide on the inner circumferential surface of the outer tube 12.

As described above, according to the burner 10 of the fourth embodiment, the following advantage is provided in addition to the advantages (1) and (3) in the first embodiment and the advantage (4) in the second embodiment.

(6) In the distal portion of the inner tube 11, the annular wire mesh 33 is held between the outer tube 12 and the radially-enlarged portion 11B of the inner tube 11 having the first to fifth mixing chambers 71-75. Compared to when the diameters of the outer and inner tubes 12, 11 are fixed, the thickness of the wire mesh 33 is decreased. The inner tube 11 expands toward the discharge port 31 while maintaining a space between the connecting wall 60 and the burner head 61.

The above embodiments may be modified in the forms described below.

In the above embodiments, the flange 11F is arranged at the distal end of the inner tube 11, but the flange 11F may be omitted. In the initial state before combustion starts, the distal end of the flange 11F may contact the inner circumferential surface of the outer tube 12.

Figure 8:
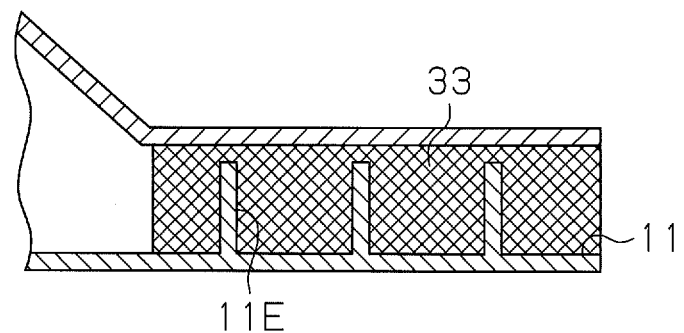
FIG. 8 is a cross-sectional view of a principal part of a burner for an exhaust gas purification device according to a modification of the present invention.

As shown in FIG. 8, a hook 11E for hooking the wire mesh 33 may project from the outer circumferential surface of the inner tube 11. The hook 11E extends substantially perpendicular to the outer circumferential surface of the inner tube 11. A plurality of hooks 11E is arranged in the axial direction of the inner tube 11. The hooks 11E may be successively formed in the circumferential direction of the inner tube 11 to have an annular shape. Alternately, the hooks 11E may be intermittently formed on the outer circumferential surface to be shaped like sectors of a circle. This fixes the wire mesh 33 more firmly. The hooks 11E interfere with a flow of air from the air supply port 12B toward the discharge port 31, and this suppresses leakage of air from the distribution chamber 35.

Figure 9:
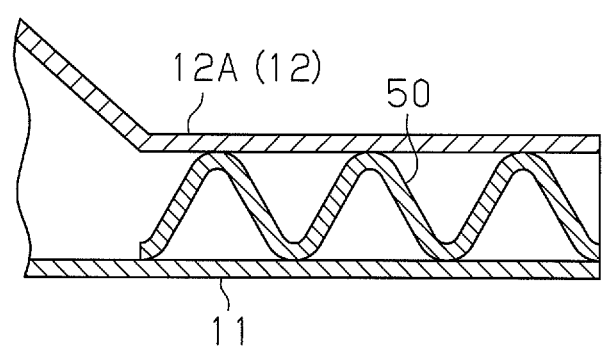
FIG. 9 is a cross-sectional view of a principal part of a burner for an exhaust gas purification device according to another modification of the present invention.

As shown in FIG. 9, as a substitute for the wire mesh 33, a bellows tube 50 may be arranged between the inner and outer tubes 11, 12. The bellows tube 50 is formed substantially cylindrical to entirely surround the inner tube 11, and the wall has a waved cross-sectional shape. When the inner tube 11 expands radially outward, the bellows tube 50 extends between the inner and outer tubes 11, 12 to absorb the radial expansion of the inner tube 11.

In the above embodiments, the orifice plate 18 is used to diffuse non-combusted fuel, but a funnel-shaped conduit with the inner diameter continuously decreasing from the inlet to the outlet, a Venturi tube, or the like may be used.

The air supply port 12B may be formed in a portion not close to the head portion such as the central portion of the outer tube 12. A plurality of air supply ports 12B may be provided.

In the above embodiments, the swirling flow generating portion includes the blades 15, which is cut and raised radially inward. However, the swirling flow generating portion may include something shaped different such as swirlers arranged on the outer circumference of the inner tube 11.

In the above embodiments, the inner tube 11 as the first tube is arranged radially inside of the outer tube 12 as the second tube. However, the first tube may be arranged radially outside of the second tube. For example, when the first tube overlaps with a second tube, which is shorter than the first tube, the length difference between the tubes forms a space in the head portion of the first tube. A combustion chamber may be arranged in the space.

In the above embodiments, the burner includes a premixing chamber, but the burner may be a diffusion combustion type burner.

In the above embodiments, the fuel supply unit 24 is a type of device that vaporizes fuel inside, but may be a type of device that sprays liquid fuel into the inner tube 11.

The ignition portion 27 may include a glow plug, a laser spark device, and a plasma spark device in addition to the spark plug as necessary. If the ignition portion 27 can generates a flame F, the ignition portion 27 may include only one of the glow plug, the laser spark device, and the plasma spark device.

Not limited to intake air flowing through the intake passage 5, air for combustion may be air flowing through a pipe connected to a brake air tank or air supplied by a blower for the burner of an exhaust gas purification device.

Not limited to the DPF 3, the exhaust gas purification device may be a device including a catalyst for purifying an exhaust gas. In this case, the burner 10 raises the temperature of the catalyst and therefore, the temperature promptly rises to the activation temperature.

The engine including the burner for an exhaust gas purification device may be a gasoline engine.

DESCRIPTION OF THE REFERENCE NUMERALS

10: burner; 11: inner tube as a first tube; 11B: radially-enlarged portion; 11E: hooks; 11F: flange; 12: outer tube as a second tube; 12A: radially-narrowed portion; 25: combustion chamber; 31: discharge port; 33: wire mesh as a closing part; 35: distribution chamber as an air flow path; 60: connecting wall included in a first connecting tube portion; 61: burner head included in a second connecting tube portion; 62: first connecting tube included in the first connecting tube portion; and 63: second connecting tube included in the second connecting tube portion.

What is claimed is:

1. A burner for an exhaust gas purification device comprising:
    a base;
    a first tube, which includes
        a basal portion and a distal portion,
        a combustion chamber for combusting air for combustion and fuel, and
        a discharge port for discharging post-combustion gas, wherein
        the basal portion is fixed to the base;
    a second tube, wherein an air flow path through which air for combustion passes is arranged between the first tube and the second tube; and
    a compressible closing part, which is fixed to the first tube or the second tube and is arranged between the distal portion of the first tube and the second tube, wherein
    the distal portion of the first tube has a circumference that is entirely, slidably supported by the second tube via the closing part.

2. The burner for an exhaust gas purification device according to claim 1, wherein
    the first tube is arranged radially inside of the second tube,
    the second tube includes a radially-narrowed portion, and
    the closing part is held between the radially-narrowed portion of the second tube and the first tube.

3. The burner for an exhaust gas purification device according to claim 1, wherein
    the first tube is arranged radially inside of the second tube,
    the first tube includes a radially-enlarged portion, and
    the closing part is held between the radially-enlarged portion of the first tube and the second tube.

4. The burner for an exhaust gas purification device according to claim 1, wherein
    the first tube includes a flange extending from a portion between the distal portion of the first tube and the closing part toward an inner circumferential surface of the second tube.

5. The burner for an exhaust gas purification device according to claim 1, wherein
    the closing part is of a wire mesh,
    the first tube includes a hook for hooking the wire mesh, and
    the hook projects from the outer circumferential surface of the first tube.

6. The burner for an exhaust gas purification device according to claim 1, wherein
    the second tube is arranged radially outside of the first tube, so that a flow path of air for combustion is formed between the first tube and the second tube,
    the burner further comprising:
        a first connecting tube portion, which is connected to the inner surface of the first tube and includes an opening at an end closer to the discharge port; and
        a second connecting tube portion, which has a lid portion and partitions the combustion chamber from a premixing chamber, wherein the second connecting tube includes a supply hole connected to the combustion chamber, wherein
    the first connecting tube portion is inserted into the second connecting tube portion while being spaced from the second connecting tube portion.

* * * * *